(12) United States Patent
Wang et al.

(10) Patent No.: US 10,605,974 B2
(45) Date of Patent: Mar. 31, 2020

(54) BACKLIGHT ASSEMBLY AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xuerong Wang, Beijing (CN); Haiwei Sun, Beijing (CN); Ruijun Dong, Beijing (CN); Junjie Ma, Beijing (CN); Caizheng Zhang, Beijing (CN); Lu Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/576,256

(22) PCT Filed: Jun. 9, 2017

(86) PCT No.: PCT/CN2017/087689
§ 371 (c)(1),
(2) Date: Nov. 21, 2017

(87) PCT Pub. No.: WO2018/019035
PCT Pub. Date: Feb. 1, 2018

(65) Prior Publication Data
US 2019/0146137 A1    May 16, 2019

(30) Foreign Application Priority Data

Jul. 27, 2016    (CN) .......................... 2016 1 0603351

(51) Int. Cl.
*F21V 8/00*    (2006.01)

(52) U.S. Cl.
CPC ......... *G02B 6/0036* (2013.01); *G02B 6/0001* (2013.01); *G02B 6/0055* (2013.01); *G02B 6/0068* (2013.01)

(58) Field of Classification Search
None
See application file for complete search history.

(56) References Cited

U.S. PATENT DOCUMENTS

| | | | |
|---|---|---|---|
| 7,889,289 B2 * | 2/2011 | Misono | G02B 5/0231 349/61 |
| 8,432,353 B2 * | 4/2013 | Nagata | G02B 6/0028 345/102 |

(Continued)

OTHER PUBLICATIONS

International Search Report and Written Opinion dated Sep. 12, 2017 in PCT/CN2017/087689.
1st Office Action dated Nov. 6, 2019 in CN201610603351.0.

*Primary Examiner* — Britt D Hanley
(74) *Attorney, Agent, or Firm* — Syncoda LLC; Feng Ma

(57) ABSTRACT

A backlight assembly includes a light guide plate, containing a plurality of dots. Each dot includes a first reflecting surface and a second reflecting surface, respectively configured to reflect a first incident light such that reflected light emerges in a first preset direction in a narrow viewing angle mode, and to diffusely reflect a second incident light such that the reflected light emerges dispersedly in a wide viewing angle mode. A first light source can be disposed over a lateral side of the light guide plate and facing the first reflecting surface, to provide the first incident light on the first reflecting surface in the narrow viewing angle mode. A second light source can be disposed over another lateral side of the light guide plate and facing the second reflecting surface to provide the second incident light on the second reflecting surface in the wide viewing angle mode.

16 Claims, 4 Drawing Sheets

(56) References Cited

U.S. PATENT DOCUMENTS

| | | | |
|---|---|---|---|
| 10,036,846 B2 * | 7/2018 | Lee | G02F 1/1323 |
| 10,254,463 B2 * | 4/2019 | Han | G02B 6/0063 |
| 2008/0112187 A1 * | 5/2008 | Katsumata | G02B 6/0068 |
| | | | 362/611 |
| 2009/0316433 A1 * | 12/2009 | Shim | G02B 6/0038 |
| | | | 362/613 |
| 2012/0235891 A1 * | 9/2012 | Nishitani | G02B 3/0056 |
| | | | 345/102 |
| 2017/0269283 A1 * | 9/2017 | Wang | G02B 6/0016 |
| 2018/0210243 A1 * | 7/2018 | Fang | G02F 1/137 |

* cited by examiner

BACKLIGHT ASSEMBLY AND DISPLAY APPARATUS

CROSS-REFERENCE TO RELATED APPLICATION

The present application claims priority to Chinese Patent Application No. 201610603351.0 filed on Jul. 27, 2016, the disclosure of which is hereby incorporated by reference in its entirety.

TECHNICAL FIELD

The present disclosure is related generally to display technologies, and more specifically to a backlight assembly and a display apparatus.

BACKGROUND

With the rapid development of the display technologies and the network technologies, more and more people are participating in online shopping and other online transactions.

In a typical online transaction, a user often needs to input personal information on a display device or an electronic device having display functionality, such as a mobile phone, a personal computer, an automatic teller machine (ATM), an automatic ticket machines, etc. The process of inputting the information can cause leakage of personal information. Therefore, anti-peeping features of a display device or an electronic device having display functionality have become an important security aspect of electronic devices.

In addition, in some special fields, specially designed display devices are sometimes needed to allow the confidential information needs to be securely transmitted to specific individuals, and as such, also these special fields highly call for the anti-peeping feature for the specially designed display devices.

The anti-peeping functionality can be a feature having both a normal display state and an anti-peeping display state. Such a feature is typically overlooked in a conventional liquid crystal display (LCD) panel. Currently, a switch between the anti-peeping display state and the normal display state is realized by simply placing or displacing a layer having a grating structure in front of the display panel. The conventional anti-peeping technology typically has disadvantages such as that the brightness of the display panel can significantly drop (e.g., ~40%), and a viewing angle for the display panel can be limited to only ~60° in the anti-peeping display state of the display panel.

SUMMARY

In order to solve the issues with conventional anti-peeping display technologies as mentioned above, the present disclosure provides a backlight assembly and a display apparatus.

In a first aspect, a backlight assembly is disclosed. The backlight assembly includes a light guide plate, which is provided with a plurality of dots. Herein each dot includes a first reflecting surface and a second reflecting surface. The first reflecting surface is configured to reflect a first incident light such that reflected light emerges from the light guide plate in a first preset direction in a narrow viewing angle mode; and the second reflecting surface is configured to diffusely reflect a second incident light such that the reflected light emerges dispersedly from the light guide plate in a wide viewing angle mode.

Herein the narrow viewing angle mode is referred to as a mode of display for the backlight assembly, where the viewing angle is narrow, thereby realizing an anti-peeping functionality. Through the disclosure, the narrow viewing angle is also referred to as an anti-peeping mode.

On the other hand, the wide viewing angle mode is referred to as a mode of display where the viewing angle is wide, thereby realizing a normal display functionality. In the disclosure, the wide viewing angle is also referred to as a normal display mode.

The backlight assembly further includes a first light source. The first light source is disposed over a lateral side of the light guide plate and facing the first reflecting surface, and is configured to provide the first incident light on the first reflecting surface in the narrow viewing angle mode.

Herein, the "lateral side" is a side of the light guide plate relative to a "top side" and a "bottom side" of the light guide plate. Throughout the disclosure, the "top side" of the light guide plate is referred to as a light-emitting side of the light guide plate. The "bottom side" of the light guide plate is referred to as a side of the light guide plate opposing to the "top side" (i.e., the light-emitting side). The "lateral side" is referred to as a side of the light guide plate having a direction to the light guide plate substantially perpendicular to the direction from the "top side" to the "bottom side" of the light guide plate.

According to some embodiments of the backlight assembly, the first reflecting surface is a substantially flat surface having a first inclination angle with a light-emitting surface of the light guide plate.

Herein the first inclination angle can be less than 45°.

In some embodiments of the backlight assembly, the first light source is configured to provide a collimated light having a maximum angle of deviation of less than 7° from a center of light.

According to some embodiments, the backlight assembly further includes a second light source. The second light source is disposed over another lateral side of the light guide plate and facing the second reflecting surface, and is configured to provide the second incident light on the second reflecting surface in the wide viewing angle mode.

Herein the second reflecting surface can be at least partially curved.

In the embodiments of the backlight assembly as described above, the second reflecting surface includes a diffuse reflection region and a deflection region, configured to allow the light emergent from the light-emitting surface of the light guide plate to become evenly distributed.

Herein the diffuse reflection region is configured to diffusely reflect a first portion of the second incident light from the second light source to thereby obtain a scattered emergent light; and the deflection region is configured to reflect a second portion of the second incident light from the second light source such that the reflected light emerges from the light guide plate in a second preset direction.

In the backlight assembly as mentioned above, the diffuse reflection region can include a curved surface; and the deflection region can include a flat surface having a second inclination angle with the light-emitting surface of the light guide plate.

Furthermore, in the backlight assembly as mentioned above, the plurality of dots can be configured such that if one dot has a relatively longer distance to the second light source, a deflection region in a second reflecting surface of the one dot has a relatively shorter distance to the light-emitting surface of the light guide plate.

According to some embodiments of the backlight assembly having the second light source, the second light source is configured to provide collimated light having a maximum angle of deviation of less than 7° from a center of light.

According to some embodiments of the backlight assembly having the second light source, the backlight assembly further includes a control switch, which is configured to turn on the second light source in the wide viewing angle mode, and to turn on the first light source and turn off the second light source in the narrow viewing angle mode.

Herein the control switch can be further configured to turn off the first light source in the wide viewing angle mode.

In any embodiment of the backlight assembly as described above, the plurality of dots can be disposed on a surface of the light guide plate opposing to a light-emitting surface of the light guide plate, and the first reflecting surface and the second reflecting surface in each of the plurality of dots are together configured to form a groove that is convex towards the light-emitting surface of the light guide plate.

In any of the embodiments as described above, the backlight assembly can further include a reflection film. The reflection film is disposed over a side of at least one of the first reflecting surface or the second reflecting surface in each dot opposing to a light-emitting surface of the light guide plate, and is configured to enhance reflection of the incident light on the at least one of the first reflecting surface or the second reflecting surface.

Herein the reflection film can have a reflection rate of ≥85%, and the reflection film can comprise aluminum or silver.

In a second aspect, the disclosure further provides a display apparatus, which includes a backlight assembly according to any embodiment as described above. The display apparatus further includes a display panel, which is disposed over a light-emitting side of the backlight assembly.

In the display apparatus, the plurality of dots in the backlight assembly can be arranged in an array; and the display panel can include a plurality of sub-pixels, and each sub-pixel can be configured to correspond to a set of multiple dots.

According to some embodiments of the display apparatus, a gap is arranged between a set of multiple dots corresponding to a first sub-pixel and a set of multiple dots corresponding to a second sub-pixel adjacent to the first sub-pixel.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiment. For those of ordinary skill in the art, other drawings of other embodiments can become apparent based on these drawings.

DETAILED DESCRIPTION

Figure 1:
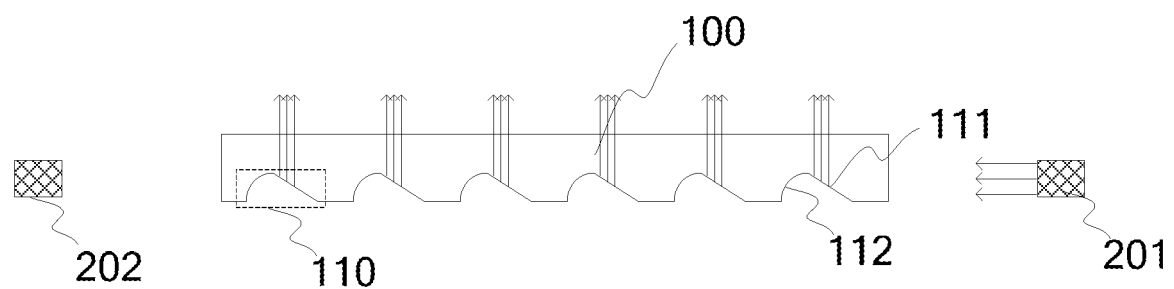
FIG. 1 is a first schematic diagram of a backlight assembly according to some embodiments of the present disclosure.

In the following, with reference to the drawings of various embodiments disclosed herein, the technical solutions of the embodiments of the disclosure will be described in a clear and fully understandable way.

It is noted that the sizes and shapes as shown in the drawings shall be regarded as serving illustrating purposes only, and do not represent or reflect the actual sizes and shapes, and are thus not considered as limitations for the present disclosure.

To address the issues associated with a conventional anti-peeping technology, such as the use of a layer with a grating structure, the present disclosure provides a backlight assembly and a display apparatus.

In one aspect, a backlight assembly is disclosed herein. The backlight assembly includes a light guide plate. The light guide plate can have a plurality of dots thereon or therein. Each dot can have a first reflecting surface and a second reflecting surface.

The first reflecting surface is configured to reflect a first incident light such that reflected light emerges from the light guide plate in a first preset direction in a narrow viewing angle mode; and the second reflecting surface is configured to diffusely reflect a second incident light such that the reflected light emerges dispersedly from the light guide plate in a wide viewing angle mode.

Figure 2:
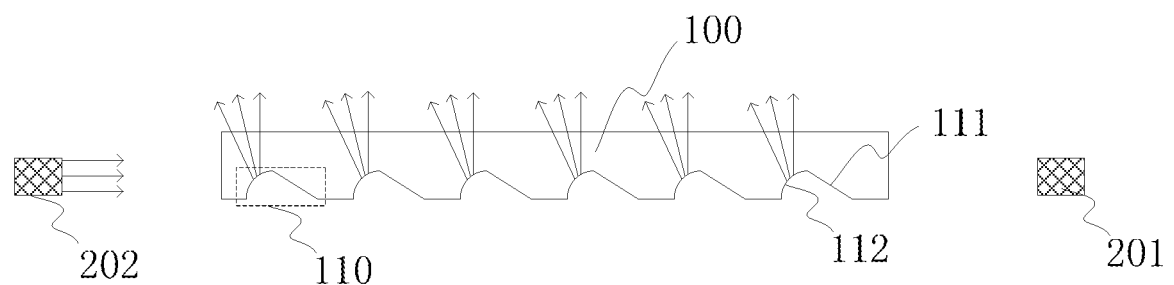
FIG. 2 is a second schematic diagram of a backlight assembly according to some embodiments of the present disclosure.

FIG. 1 and FIG. 2 illustrate a backlight assembly according to some embodiments of the present disclosure.

As shown in the figures, the backlight assembly comprises a light guide plate 100, and one or more light sources 201, 202 disposed over a lateral side of the light guide plate 100. The light guide plate 100 is provided with a plurality of dots 110, which can be evenly distributed in or on the light guide plate 100.

Although the term "dots" is used herein, the dots can refer to any geometrical structures of any shapes and sizes. For example, the dots can be indentations on a surface of the light guide plate 100. In some other embodiments, the dots can be protrusions from a surface of the light guide plate 100. In some other embodiments, the dots can be cavities embedded in the light guide plate 100. In some other embodiments, the dots can be composed of materials with refractive indices different from that of the light guide plate 100.

According to some embodiments, each of the plurality of dots 110 comprises a first reflecting surface 111 and a second reflecting surface 112, wherein the first reflecting surface 111 is configured to reflect light from the light source in an anti-peeping mode such that reflected light 100 can emit in a preset direction, as illustrated in FIG. 1. The second reflecting surface 112 is configured to diffusely reflect the light from the light source in a normal display mode, as illustrated in FIG. 2.

In the backlight assembly as described above, the first reflecting surface 111 and the second reflecting surface 112 allow a switching between an anti-peeping mode and a normal display mode.

In the anti-peeping mode, the first reflecting surface 111 can reflect the light from the light source 201 such that the reflected light 100 can emit in the preset direction. The user can view the display content from the preset direction within a rather limited viewing angle or field of view. However, an onlooker cannot see the display content from a direction other than the present direction, thereby realizing an anti-peeping display.

In the normal display mode, the second reflecting surface 112 can diffusely reflect the light from the light source 202. The reflected light 100 can dispersedly emerge from the light guide plate 100. In this case, one or more viewers can see the display content from various directions within a large range of viewing angles, thereby realizing a normal display.

In practice, typically a user faces the display panel straight when viewing content from the displaying panel. In the anti-peeping mode, an inclination angle of the first reflecting surface 111 can be configured such that the reflected light can emit in a direction substantially perpendicular to the display panel (i.e., the direction having a viewing angle of about 90°). Herein, the viewing angle is referred to as the angle between a line of sight of the user and the front surface of the display panel.

In the anti-peeping mode of the display panel, the light can be brightest at the viewing angle of 90°. The emergent light from the backlight assembly is mostly in a direction perpendicular to the display panel. Compared with a conventional display panel having an anti-peeping layer using a grating structure, the display panel equipped with the backlight assembly as described above not only has an enhanced anti-peeping functionality in the anti-peeping mode, but also results in an increased display brightness in the anti-peeping mode.

Figure 3:
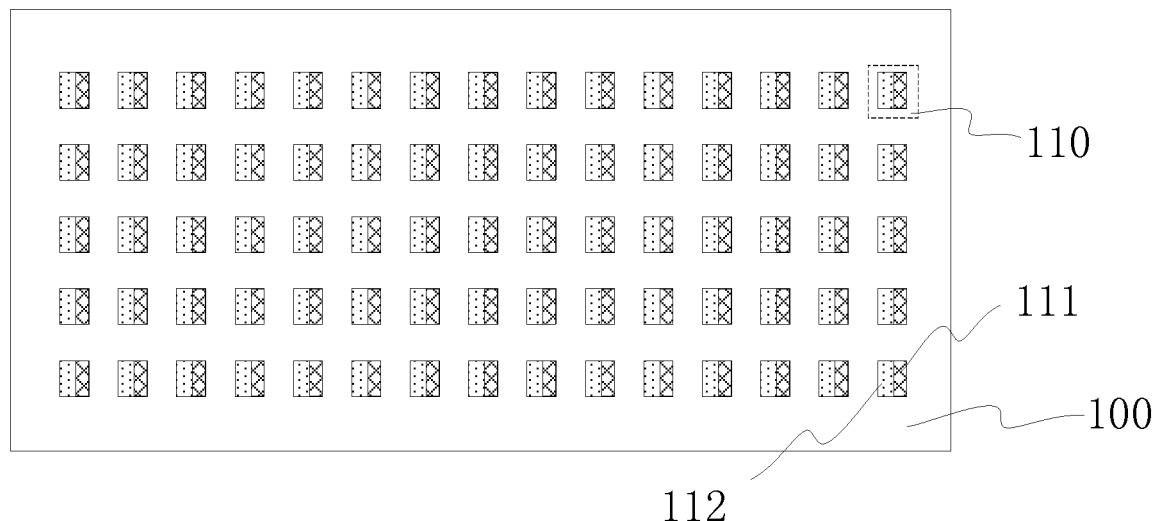
FIG. 3 is a top view of a backlight assembly according to some embodiments of the present disclosure.

As shown in FIG. 3, the plurality of dots 110 of the light guide plate 100 can be arranged in an array and distributed evenly. It should be noted that FIG. 3 is for illustrating purposes only and does not necessarily reflect the actual numbers, sizes, or shapes of the plurality of dots 110, and thus does not impose a limitation to the present disclosure herein.

In the embodiments of the backlight assembly as described above, the plurality of dots 110 are disposed on a surface opposing to a light-emitting surface of the light guide plate 100. In each of the plurality of dots 110, the first reflecting surface 111 and the second reflecting surface 112 are configured to form a groove which is convex towards the light-emitting surface of the light guide plate 100. Such a structure allows the light from a first light source 201 and/or from a second light source 202 to be easily coupled into the light guide plate 100.

In a first embodiment of the backlight assembly, as shown in FIG. 1, the backlight assembly comprises a first light source 201, which is arranged to face, and configured to provide a collimated light incident upon, the first reflecting surface 111. The first reflecting surface 111 can be a flat surface having a first inclination angle with the light-emitting surface of the light guide plate 100.

The first inclination angle is preferably less than 45°, which can cause the emergent light to be more guided toward the light-emitting surface of the light guide plate 100 after the first incident light from the first light source 201 is reflected by the first reflecting surface 111. Such a configuration can effectively prevent the emergent light from emitting back towards the first light source 201, as in the case of an over largely first inclination angle.

The first inclination angle can be adjusted, and the emergent light can have a different emitting direction after the first incident light from the first light source 201 is reflected by the first reflecting surface 111.

By configuring the first light source 201 to provide a collimated light incident towards the first reflecting surface 111, and by configuring the first reflecting surface 111 to have a flat surface, parallel incident light can remain parallel after reflection by the first reflecting surface 111, as shown in FIG. 1.

By adjusting the inclination angle between the first reflecting surface 111 and the light-emitting surface of the light guide plate 100, and/or by adjusting the direction of the collimated incident light provided by the first light source 201, the emergent light can be controlled to emit in a preset direction. For example, FIG. 1 illustrates an embodiment of the backlight assembly having a preset direction perpendicular to the light-emitting surface of the light guide plate 100.

Figure 4:
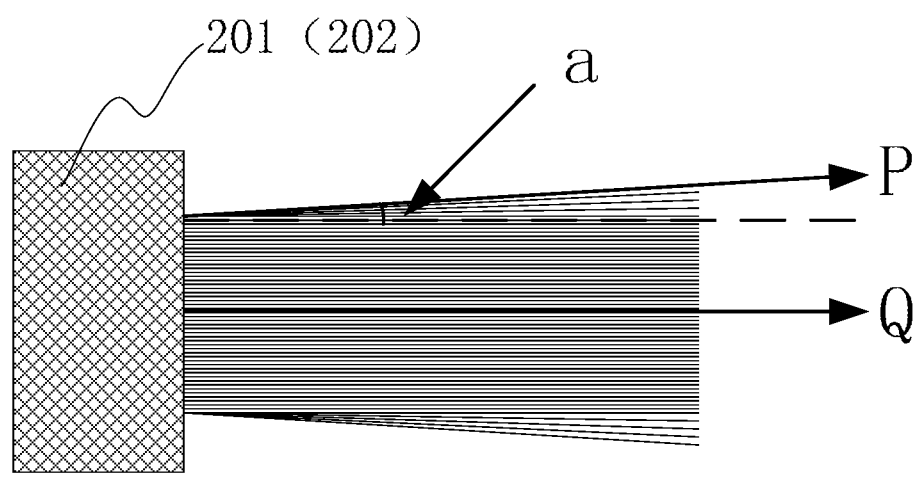
FIG. 4 is a schematic diagram of collimated light beams emitted from the first light source and/or the second light source according to some embodiments of the present disclosure.

In some implementations, the collimated light beam from the first light source has a maximum angle of deviation from the center of light of less than 7°. As illustrated in FIG. 4, the maximum angle of deviation from the center of light is referred to as an angle between the light at the margin and the light in the center, i.e., the angle a between the P direction and the Q direction. The angle a is preferably less than 7°.

Because the plurality of dots 100 are relatively small in sizes and the collimated light from the first light source 201 has a maximum angle of deviation from the center of light of less than 7°, light from a collimated light source can substantially completely incident upon the light guide plate 100 and onto the plurality of dots 110. Light emergent through the light-emitting surface of the light guide plate 100 can therefore be very even.

The first light source 201 can be a light emitting diode (LED) collimated light source, or can be a laser collimated light source. Other types of light sources can also be used as the first light source 201.

The first light source 201 in FIG. 1 and FIG. 2 can have sizes and shapes different from those shown in the drawings, which are for illustrative purposes only. In some embodiments, the first light source 201 is preferred to have a small size to improve the compactness of the backlight assembly.

As shown in FIG. 2, the light source in the backlight assembly can further comprise a second light source 202, which is arranged to face, and configured to provide light towards, the second reflecting surface 112. The second light source 202 is preferably also a collimated light source. The second reflecting surface 112 is configured to be partially curved.

By configuring the second reflecting surface 112 to be partially curved, the second incident light from the second light source 202 can be diffusely reflected to different directions, to thereby allow a viewer see the content on the display panel from all available directions in the normal display mode.

The light from the second light source 202 can be a collimated, parallel, light beam, as shown in FIG. 2. The second light source 202 is preferably a collimated light source. For example, the second light source 202 can emit a collimated light beam with a maximum angle of deviation from the center of the light beam to be less than 7°. In some other embodiments, the second light source 202 can be a regular light source.

Density and direction of the emergent light can depend on the direction of the second incident light and on the curvature of the second reflecting surface 112, and are not necessarily the same as shown in the drawings. The second reflecting surface 112 can comprise a curved surface of various shapes that are capable of realizing a diffused reflection. For example, the second reflecting surface 112 can comprises a convex surface, a concave surface, or a combination thereof. There are no limitations on the shape of the second reflecting surface 112 herein.

As illustrated in FIG. 4, the maximum angle of deviation from the center of light is referred to as an angle between the light at the margin and the light in the center, i.e., the angle a between the P direction and the Q direction. The angle a is preferably less than 7°. As such, light from a collimated light source can become substantially completely incident onto the light guide plate 100 and onto each of the plurality of dots 110. Therefore, light emergent through the light-emitting surface of the light guide plate 100 can be very even.

The second light source 202 can be a light emitting diode (LED) collimated light source, or can be a laser collimated light source. In some other embodiments, other types of light sources can be adopted.

In the embodiments that the second light source 202 is a regular light source, the light is not a collimated, parallel, light beam. The light from the second light source 202 can also be incident onto the light guide plate 100 and reach each of the plurality of dots 110. The light can further reflect among the plurality of dots 110 before emerging from the light-emitting surface of the light guide plate 100.

It is noted that the second light source 202 shown in FIG. 1 and FIG. 2 can have a size and shape different from that shown. In some embodiments, the second light source 202 is preferred to have a relatively small size to improve the compactness of the backlight assembly.

The backlight assembly can further comprise a control switch (not shown), which is configured to turn on the second light source 202 (i.e., to control the second light source 202 to emit light) in the normal display mode, and to turn on the first light source 201 (i.e., to control the first light source 201 to emit light) and turn off the second light source 202 in the anti-peeping mode.

In the anti-peeping mode, only the first reflecting surface 111 can receive a first incident light, from the first light source 201. After reflection by the first reflecting surface 111, light exits the light-emitting surface of the light guide plate 100 in the preset direction, thereby allowing a viewer to see the content on the display panel only from the preset direction. Because the light from the light-emitting surface is substantially limited to the preset direction, onlookers cannot view the content on the display panel from other directions. As such, the anti-peeping functionality is realized.

In the normal display mode, the control switch controls the second light source 202 to turn on, and the first light source 201 can be controlled to turn on or off. If the first light source 201 is turned off, only the second reflecting surface 112 can receive a second incident light, from the second light source 202. After diffused reflection by the second reflecting surface 112, light emerging from the light-emitting surface of the light guide plate 100 is scattered, thereby allowing one or more viewers to see the content on the display panel from all available directions. As such, a normal display is realized.

If the first light source 201 is also turned on, both the first reflecting surface 111 and the second reflecting surface 112 can receive incident lights (i.e. the first incident light and the second incident light), respectively from the first light source 201 and the second light source 202. In this case, light emergent from the light-emitting surface of the light guide plate 100 can have enhanced brightness, leading to an improved display effect.

Figure 5A:
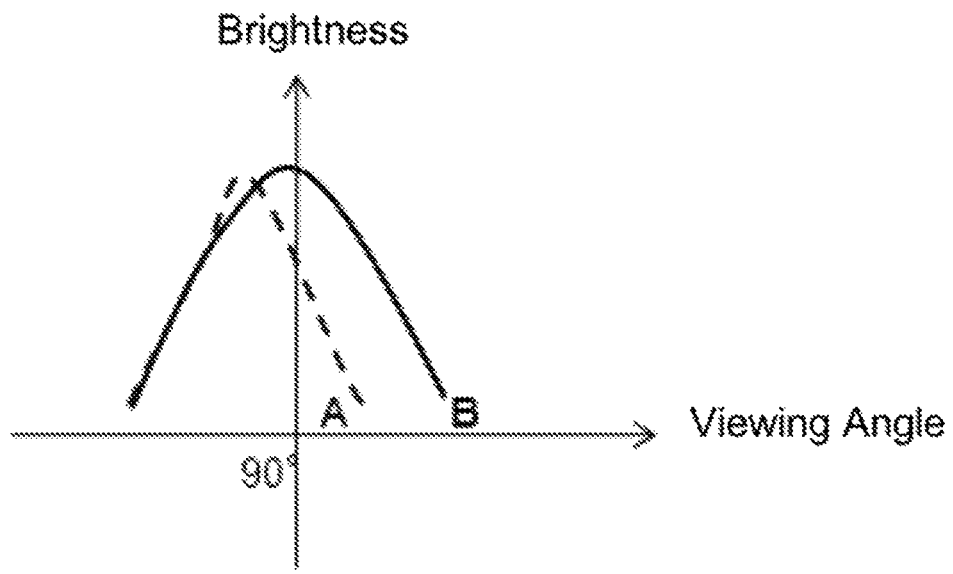
FIG. 5A illustrates a distribution of brightness of emergent lights in the normal display mode of the backlight assembly according to some embodiments of the present disclosure.

If the plurality of dots in the light guide plate 100 were distributed in a non-even manner, the closer to the light source, the more concentrated the dots. In the backlight assembly as described above, the plurality of dots in the light guide plate 100 are evenly distributed, allowing the light emergent from the light-emitting surface of the light guide plate 100 to have an even brightness in the anti-peeping mode, as illustrated in FIG. 5A, and allowing the light emergent from the backlight assembly to be concentrated in the preset direction in the normal display mode, as shown in FIG. 5B.

Figure 5B:
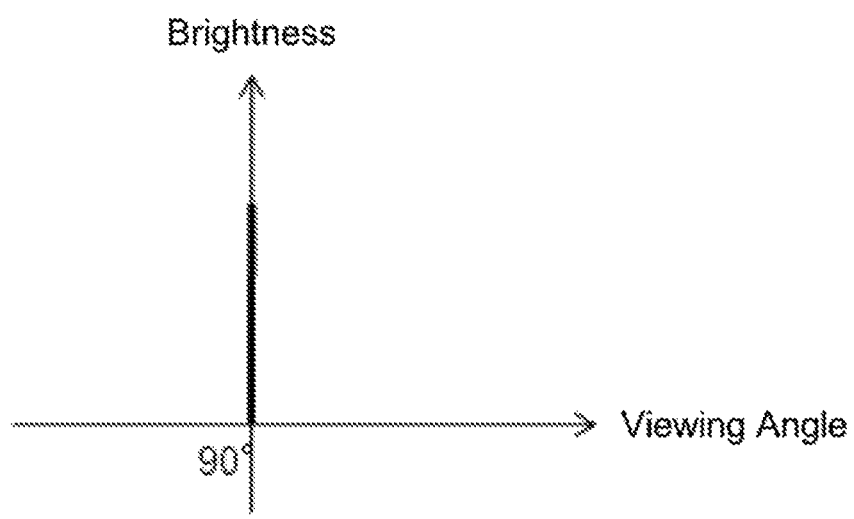
FIG. 5B illustrates a distribution of brightness of emergent lights in the anti-peeping mode of the backlight assembly according to some embodiments of the present disclosure.

FIG. 5B illustrates a viewing angle of 90° as the preset direction. The thick line in the figure represents a position (i.e., at the viewing angle of 90°) where the brightness of the light is concentrated.

In the normal display mode, however, the brightness of light emergent from the light-emitting surface of the light guide plate 100 can be uneven, such that a side closer to the second light source 202 has a higher brightness than a side farther from the second light source 202. As such, a deviation of the viewing angle (as shown by the curve A in FIG. 5A) can occur and the display effect can be affected.

In some embodiments, the normal display mode can be configured such that the first light source 201 is turned on as is the second light source 202. In this case, the brightness on the side farther from the second light source 202 can be compensated. The compensating effect in terms of the viewing angle is illustrated by the curve B in FIG. 5A.

In some embodiments, to relieve the issue of uneven brightness on the light-emitting surface of the light guide plate 100 in the normal display mode, the control switch as described above can be configured to control the first light source 201 to turn off in the normal display mode.

Figure 6:
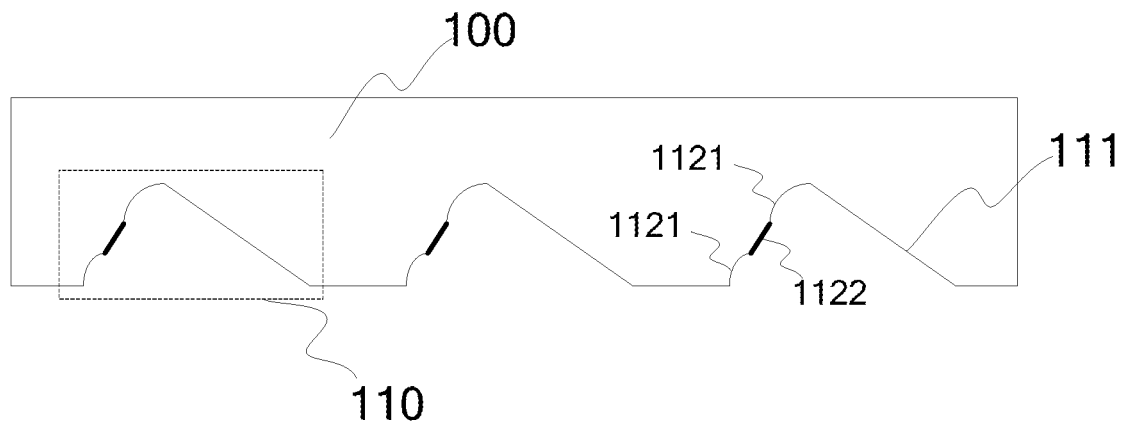
FIG. 6 is a schematic diagram of a backlight assembly according to some other embodiments of the present disclosure.

As shown in FIG. 6, in some embodiments, the second reflecting surface 112 can comprise diffuse reflection regions 1121, and a deflection region 1122.

Each diffuse reflection region 1121 is configured to diffusely reflect the second incident light from the second light source 202, to thereby obtain scattered emergent light. The deflection region 1122 is configured to reflect the second incident light from the second light source 202 to thereby obtain emergent light emitting in a direction perpendicular to the light-emitting surface of the light guide plate 100.

According to some embodiments, each diffuse reflection region 1121 can have a curved surface, whereas the deflection region 1122 can have a flat surface having a second inclination angle with respect to the light-emitting surface of the light guide plate 100.

To concisely illustrate the structure of the second reflecting surface 112, only three dots 110 are shown in FIG. 6. However, there are no limitations on the number of dots.

A first portion of the light emitted from the second light source 202 exits the light-emitting surface of the light guide plate 100 in a scattered manner, after diffuse reflection by the diffuse reflection regions 1121. A second portion of the light exits the light-emitting surface of the light guide plate 100 in a direction perpendicular to the light-emitting surface of the light guide plate 100 after reflection by the deflection region 1122.

As such, the diffuse reflection regions 1121 and the deflection region 1122 respectively reflect the light from the second light source 202. The light emergent from the light-emitting surface of the light guide plate 100 can become more evenly distributed. Furthermore, because there is no need to compensate by turning on the first light source 201, the energy consumption can be reduced in this embodiment.

In some embodiments, in the second reflecting surface 112 of each of the plurality of dots, a distance between the deflection region 1122 of each dot and the light-emitting surface of the light guide plate 100 can be configured to decrease with an increasing distance between the each dot and the second light source 202. In other words, it is configured such that if one dot has a relatively longer distance to the second light source 202, a deflection region in a second reflecting surface of the one dot has a relatively shorter distance to the light-emitting surface of the light guide plate 100. Herein the distance between the deflection region 1122 of one dot and the light-emitting surface of the light guide plate 100 can be the distance between a geometric center of the deflection region 1122 and the light-emitting surface of the light guide plate 100.

In some embodiments, the position of a deflection region 1122 corresponding to each dot 110 can be configured based on the distance between the each dot 110 and the second light source 202. For example, it can be configured such that a deflection region 1122 corresponding to a dot 110 closer to the second light source 202 is at a relatively lower position (i.e., a position relatively farther from the light-emitting surface of the light guide plate), and that a deflection region 1122 corresponding to a dot 110 farther from the second light source 202 is at a relatively upper position (i.e., a position relatively closer to the light-emitting surface of the light guide plate 100), so as to further cause the light emergent from the light-emitting surface of the light guide plate 100 to be more even.

According to some embodiments of the present disclosure, the number of deflection regions 1122 and/or the number of diffuse reflection regions 1121 can be adjusted to alter the evenness of the light emergent from the light-emitting surface of the light guide plate 100. For example, a dot closer to the second light source 202 can be provided with one deflection region 1122, and another dot farther from the second light source 202 is provided with two deflection regions 1122. It is noted that the numbers in this example are only for illustrative purposes only, and do not impose limitations on the number of the deflection regions 1122 and the number of the diffuse reflection regions 1121.

In some embodiments, the dots 110 are formed with a photolithography process, and correspondingly the fabrication of the two deflection regions 1122 would need two exposure and development processes, which in turn need accurate positioning during the photolithography.

The reflection effects can be different depending on the dimensions of the dots 110. In an example shown in FIG. 7, a maximum depth n of the dots 110 along a direction perpendicular to the light-emitting surface of the light guide plate 100 is preferably 20 μm; a width m and a length (or pitch, which is not shown in the drawings) of a largest cross-section along a direction parallel to the light-emitting surface of the light guide plate 100 are preferably 30 μm and 400 μm, respectively.

In the backlight assembly having the plurality of dots 110 configured with dimensions as described above according to an embodiment, the light emergent from the light-emitting surface of the light guide plate 100 has a luminous flux of 39.94 lm. An average brightness for a straight viewing angle is 3315 nits in the normal display mode of this amendment. In the anti-peeping mode, the light emergent from the light-emitting surface of the light guide plate 100 has a luminous flux of 42.19 lm, and an average brightness for a straight viewing angle of 6133 nits in this embodiment.

In the embodiment of the backlight assembly as described above, the luminous flux and the average brightness for the straight viewing angle of the light emergent from the light-emitting surface of the light guide plate 100 is not lower in the anti-peeping mode than in the normal display mode.

Figure 7:
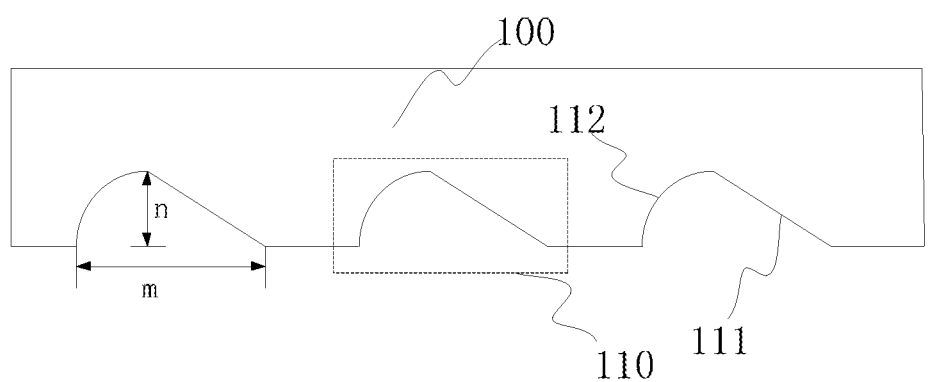
FIG. 7 is a schematic diagram of a backlight assembly according to some embodiments of the present disclosure.

Although only three dots 110 are shown in FIG. 7 to concisely illustrate the structure of the second reflecting surface 112, the number of dots 110 are not limited by the examples. In the example shown in FIG. 7, the dimensions of the dots, including a width of 30 μm, a maximum depth of 10 μm, and a length (or pitch) of 400 μm along a direction perpendicular to the paper, are only example dimensions for the plurality of dots 110 according to some embodiments, and do not impose any limitations on the dimensions of the dots 110.

In some embodiments of the backlight assembly, a surface of the first reflecting surface 111 and/or a surface of the second reflecting surface 112 that is opposing to the light-emitting surface of the light guide plate 100 can be provided with a reflection film, and the reflection film is preferably configured to have a reflection rate of ≥85%.

By disposing a reflection film on the surface of both the first reflecting surface 111 and the second reflecting surface 112 that is opposing to the light-emitting surface of the light guide plate 100, the reflection rate of the first reflecting surface 111 and the second reflecting surface 112 can be enhanced, preventing the light incident on the first reflecting surface 111 and the second reflecting surface 112 from being deflected, and thus improving the utilization rate of light.

According to some embodiments, the reflection film can be disposed at each gap region between the dots 110, so as to prevent the light from being deflected through the gap regions, thus avoiding the loss of light.

To fabricate the reflection film, the surface of the light guide plate 100 opposing to the light-emitting surface can be coated with a metal layer by evaporation. The reflection film preferably has a composition of aluminum or silver.

If the reflection film has a reflection rate of ≥85%, most of the light incident upon the first reflecting surface 111 or the second reflecting surface 112 can exit the light-emitting surface of the light guide plate 100 after reflection, thereby maximizing the utilization rate of the light. As such, the reflection film can be an aluminum film (having a reflection rate of 85%), a silver film (having a reflection rate of 90%), or a film of other composition. There are no limitations herein.

In another aspect, a display apparatus is provided. The display apparatus comprises a backlight assembly according to any one of the embodiments as described above, and a display panel disposed over a light-emitting side of the backlight assembly.

The display apparatus can be part of a mobile phone, a tablet computer, a television, a monitor, a notebook computer, a digital camera, a GPS, or an electronic device/component having a display.

In some embodiments of the display apparatus, the plurality of dots in the backlight assembly as described above are arranged in an array, and each sub-pixel in the display panel corresponds to a set of multiple dots. For example, one sub-pixel in the display panel can correspond to 8-10 dots. To prevent color crossing, a gap is arranged between the set of multiple dots corresponding to each sub-pixel and the set of multiple dots corresponding to a neighboring sub-pixel. As such, during fabrication of the plurality of dots, the dots need to be positioned accurately to correspond to the sub-pixels of the display panel.

The backlight assembly of the display apparatus can comprise a light guide plate 100, a first light source 201, a second light source 202, and a controller configured to turn on/off the first light source 201 and the second light source 202. The light guide plate 100 is provided with a plurality of dots 110, which are evenly distributed in the light guide plate 100.

Each of the plurality of dots 110 comprises a first reflecting surface 111 and a second reflecting surface 112. The first reflecting surface 111 is configured to reflect light from the first light source 201 in an anti-peeping mode such that a reflected light can emit in a preset direction. As such, a viewer can only see the display content from the preset direction, while onlookers from other directions cannot see the display content. The second reflecting surface 112 is configured to diffusely reflect the light from the second light source 202 in a normal display mode. In this mode viewers are able to see the display content from all available directions.

A switching between the anti-peeping mode and the normal display mode can be realized by turning on/off the first light source 201 and the second light source 202, for example by the controller.

In yet another aspect, a method of realizing an anti-peeping mode and switching between the anti-peeping mode and a normal display mode is provided, by switching on/off the first light source and/or the second light source as described above.

All references cited in the present disclosure, if any, are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A backlight assembly, comprising a light guide plate, wherein:
the light guide plate has a plurality of dots, each comprising a first reflecting surface and a second reflecting surface, wherein:
the first reflecting surface is configured to reflect a first incident light such that reflected light emerges from the light guide plate in a first preset direction in a narrow viewing angle mode;
the second reflecting surface is configured to diffusely reflect a second incident light such that the reflected light emerges dispersedly from the light guide plate in a wide viewing angle mode;
the backlight assembly further comprises:
a first light source, wherein the first light source is disposed over a lateral side of the light guide plate and facing the first reflecting surface, and is configured to provide the first incident light on the first reflecting surface in the narrow viewing angle mode; and
a second light source, wherein the second light source is disposed over another lateral side of the light guide plate and facing the second reflecting surface, and is configured to provide the second incident light on the second reflecting surface in the wide viewing angle mode;
the second reflecting surface is at least partially curved;
the second reflecting surface comprises a diffuse reflection region and a deflection region, configured to allow the light emergent from the light-emitting surface of the light guide plate to become evenly distributed;
the diffuse reflection region is configured to diffusely reflect a first portion of the second incident light from the second light source to thereby obtain a scattered emergent light; and
the deflection region is configured to reflect a second portion of the second incident light from the second light source such that the reflected light emerges from the light guide plate in a second preset direction.

2. The backlight assembly of claim 1, wherein the first reflecting surface is a substantially flat surface having a first inclination angle with a light-emitting surface of the light guide plate.

3. The backlight assembly of claim 2, wherein the first inclination angle is less than 45°.

4. The backlight assembly of claim 1, wherein the first light source is configured to provide a collimated light having a maximum angle of deviation of less than 7° from a center of light.

5. The backlight assembly of claim 1, wherein:
the diffuse reflection region comprises a curved surface; and
the deflection region comprises a flat surface having a second inclination angle with the light-emitting surface of the light guide plate.

6. The backlight assembly of claim 5, wherein the plurality of dots are configured such that if one dot has a relatively longer distance to the second light source, a deflection region in a second reflecting surface of the one dot has a relatively shorter distance to the light-emitting surface of the light guide plate.

7. The backlight assembly of claim 1, wherein the second light source is configured to provide collimated light having a maximum angle of deviation of less than 7° from a center of light.

8. The backlight assembly of claim 1, further comprising a control switch configured to:
turn on the second light source in the wide viewing angle mode; and
turn on the first light source and turn off the second light source in the narrow viewing angle mode.

9. The backlight assembly of claim 8, wherein the control switch is further configured to turn off the first light source in the wide viewing angle mode.

10. The backlight assembly of claim 1, wherein:
the plurality of dots are disposed on a surface of the light guide plate opposing to a light-emitting surface of the light guide plate; and the first reflecting surface and the second reflecting surface in each of the plurality of dots are together configured to form a groove that is convex towards the light-emitting surface of the light guide plate.

11. The backlight assembly of claim 1, further comprising a reflection film, wherein the reflection film is disposed over a side of at least one of the first reflecting surface or the second reflecting surface in each dot opposing to a light-emitting surface of the light guide plate, and is configured to enhance reflection of the incident light on the at least one of the first reflecting surface or the second reflecting surface.

12. The backlight assembly of claim 11, wherein the reflection film has a reflection rate of ≥85%.

13. The backlight assembly of claim 11, wherein the reflection film comprises aluminum or silver.

14. A display apparatus, comprising:
a backlight assembly according to claim 1; and
a display panel, disposed over a light-emitting side of the backlight assembly.

15. The display apparatus according to claim 14, wherein:
the plurality of dots in the backlight assembly are arranged in an array;
the display panel comprise a plurality of sub-pixels; and
each sub-pixel corresponds to a set of multiple dots.

16. The display apparatus according to claim 15, wherein a gap is arranged between a set of multiple dots corresponding to a first sub-pixel and a set of multiple dots corresponding to a second sub-pixel adjacent to the first sub-pixel.

* * * * *